UNITED STATES PATENT OFFICE.

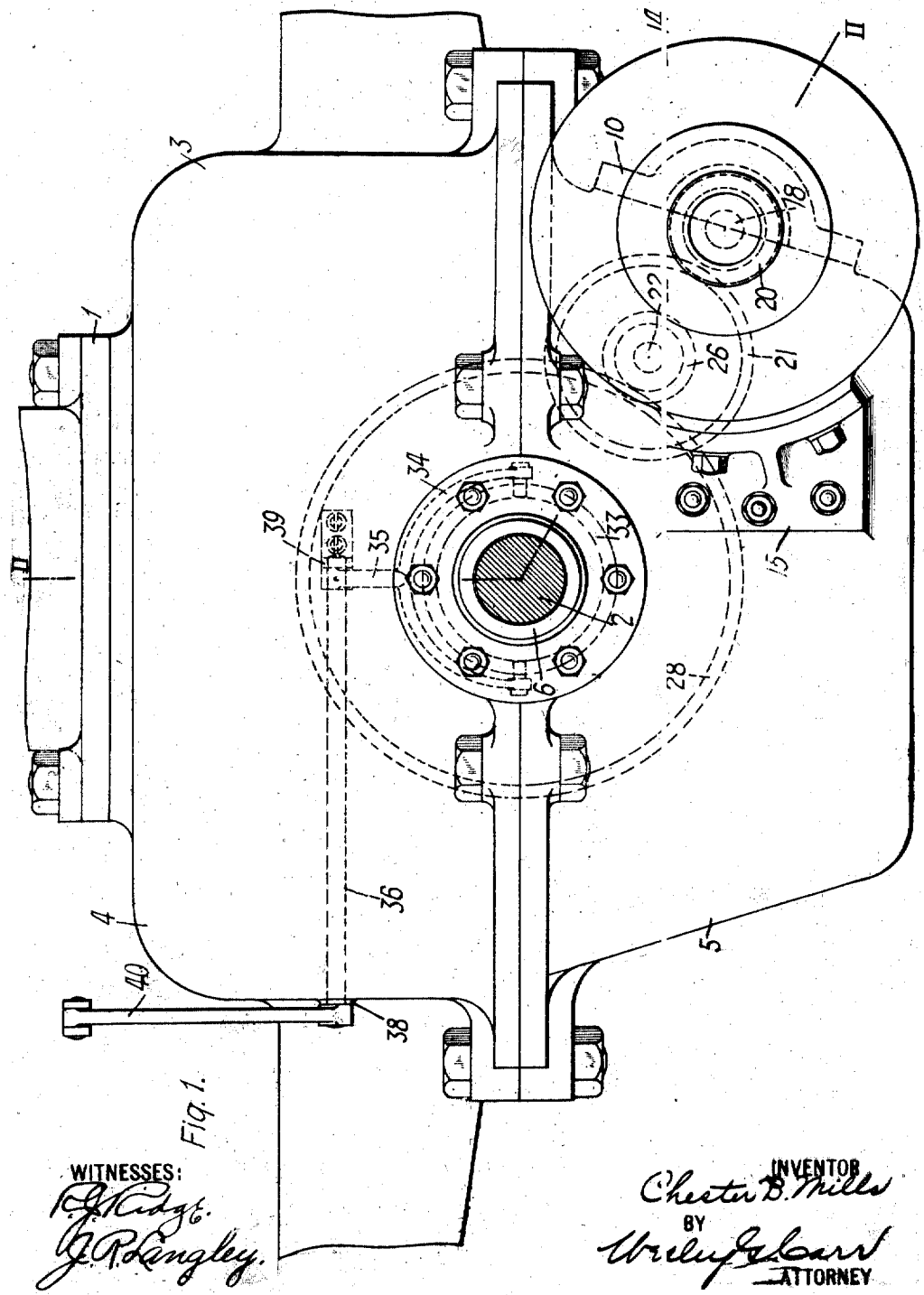

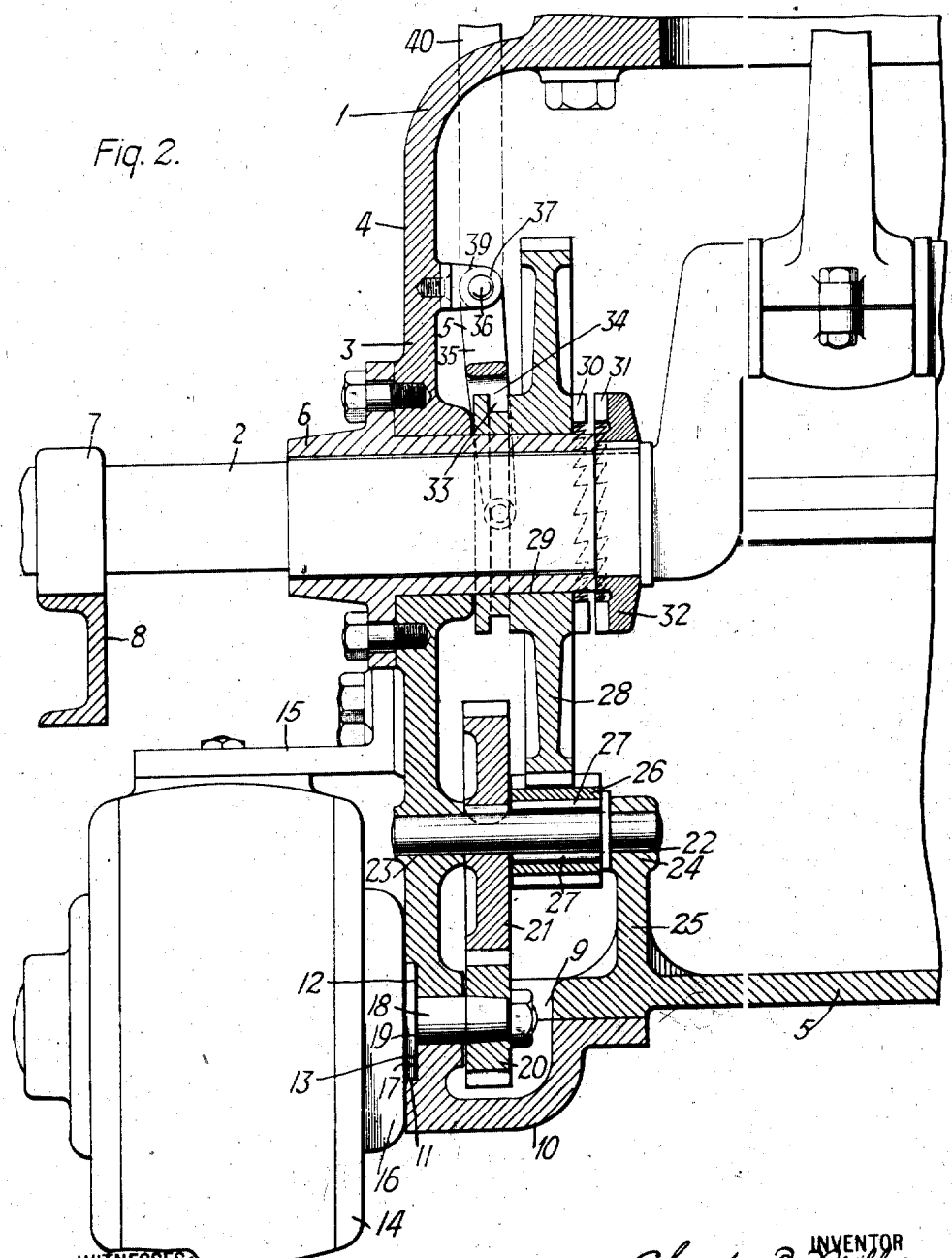

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

STARTING DEVICE FOR AUTOMOBILES.

1,215,568.  Specification of Letters Patent.  Patented Feb. 13, 1917.

Application filed March 28, 1913. Serial No. 757,365.

*To all whom it may concern:*

Be it known that I, CHESTER B. MILLS, a citizen of the United States, and a resident of East McKeesport, in the county of Allegheny and State of Pennsylvania, have invented a new and useful Improvement in Starting Devices for Automobiles, of which the following is a specification.

My invention relates to starting devices for automobiles and it has particular reference to that type of starting device in which a motor and gear mechanism are employed.

My invention has for one of its objects to provide a mechanism for connecting a starting motor to the shaft of a gas engine, which may be assembled with the engine parts and form a unitary structure with the engine.

A second object of my invention is to provide a means for mounting the gear mechanism of a starting motor which will require a very small space in addition to that necessary for the engine parts.

A further object of my invention is to provide a means for protecting and lubricating the gear mechanism which connects the starting motor to the engine shaft by utilizing a portion of the engine structure for this purpose.

In the use of starting motors, as ordinarily employed in connection with the gas engines of automobiles, or other motor vehicles, it has been the practice to assemble the motor and the gear mechanism and attach them to their respective supports after the engine is in place. The gear mechanism must be so arranged as not to interfere with the moving parts of the engine and an additional casing is required to protect the said mechanism from dirt or elements. In my invention, these objections are avoided and the above objects are accomplished by placing the gear mechanism in the crank case of the engine and attaching the starting motor directly to the crank case.

My invention is described in detail in connection with the accompanying drawings in which Figure 1 is an end view, in elevation, of a gas engine with the starting mechanism attached thereto, parts being broken away. Fig. 2 is a sectional view on line II—II of Fig. 1, parts of the engine being broken away.

A portion of the gas engine of an automobile is shown at 1, the remainder being broken away for the sake of clearness. The engine comprises a crank shaft 2, and a crank case 3 that is composed of two members 4 and 5. The crank shaft 2 is provided with a main bearing 6 that is suitably connected to the crank case and a bearing 7 upon a frame member 8. The member 5, which forms the lower part of the crank case, is provided with an opening 9 that is covered by a detachable housing 10. A cylindrical recess 11 is formed with substantially equal parts of the recess in the walls of the member 5 and the housing 10, respectively. The surfaces 12 and 13 surrounding the recess are machined for engagement as described below. A motor 14 is supported by a bracket 15 that is attached to the crank case 3, the front end casing 16 of the motor making a close fit with the surfaces 12 and 13. A boss 17 on the casing 16 enters the recess 11 and thereby centers the motor. The motor shaft 18 extends into the crank case through a bearing 19 that is in axial alinement with the recess 11. The motor shaft is provided with a pinion 20 that is located in the opening 9 and is covered by the housing 10.

The pinion 20 meshes with a gear wheel 21 that is keyed to a shaft 22. The shaft 22 is supported in bearings 23 and 24 that are located respectively in the front wall of the crank case and in a lug 25 that is integral with the crank case. A pinion 26 is loosely mounted on the shaft 22 and is provided with a one-way clutch of the roller type. This clutch comprises rollers 27 that are mounted in inclined grooves (not shown) and are adapted to engage the shaft 22 when the motor is driving.

A gear wheel 28 is slidably and rotatably mounted upon an extended sleeve portion 29 of the main bearing 6. The rear face of the hub of the gear wheel 28 is provided with inclined clutch teeth 30 which co-act with similar teeth 31 on a clutch member 32 that is fixed on the engine shaft. The teeth of the pinion 26 are of such length that they are always in mesh with the teeth of the gear wheel 28.

The gear wheel 28 has an integral grooved collar member 33 to be engaged by the arms 34 of a yoke member 35. The member 35 is fixed on a rock shaft 36 that is supported by bearings 37 and 38 located, respectively, in a lug 39 on the crank case wall and in the side wall of the crank case. The rock shaft 36 is actuated by a lever 40 that is connected by any suitable means to a pedal or lever (not shown) near the operator's seat.

When it is desired to start the engine, the gear wheel 28 is shifted backwardly by the mechanism just described, to effect the engagement of the clutch teeth 30 and 31. The motor, which may be a dynamo electric machine or a fluid pressure motor, is then operated through any suitable connections to rotate the engine shaft through the reduction gear mechanism above described. When the engine starts under its own power, the roller clutch allows the gear wheel 28 to drive the pinion 26 faster than the shaft 22 is rotated by the motor. The use of the roller clutch is not necessary, because the clutch teeth 31 would overrun the clutch teeth 30, but its use is desirable in order to avoid an unpleasant chattering noise that is produced by the clutch teeth 30 and 31 as they slip past each other. When the operator releases the pedal, the gear wheel 28 is shifted to its inoperative position by a suitable spring (not shown) that may be attached to the shifting mechanism.

By means of the construction above described, the gear mechanism may be assembled with the engine structure and the motor attached when desired. The gear mechanism is protected by the crank case and is lubricated by the oil in the crank case as it is splashed by the cranks of the engine shaft. The motor may be detached readily by removing the housing 10 and the bolts which attach the motor to the bracket 15. The employment of a one-way clutch insures that no operative connection can be made between the engine shaft and the motor when the engine is running. By mounting the gear wheel 28 on the bearing 6, I avoid the constant wear caused by mounting a gear or a clutch member upon a rotating part of the engine.

It is understood that such changes may be made in the details of my invention as fall within the limits of the appended claims.

I claim as my invention:

1. In a starting device, the combination with an engine having a crank shaft and a crank case, of a starting motor, and means within said crank case for operatively connecting said motor to said crank shaft.

2. In a starting device, the combination with an engine having a shaft and a crank case, of a motor, and gear mechanism within said crank case for operatively connecting said motor to said shaft.

3. In a starting device, the combination with an engine having a crank shaft and crank case, of a motor outside said crank case, and reduction gear mechanism inside said crank case for operatively connecting said motor to said shaft.

4. In a starting device, the combination with an engine having a crank shaft and a crank case, of a motor, gear mechanism within said crank case operatively connected to said motor, and means for operatively connecting said mechanism to said crank shaft.

5. In a starting device, the combination with an engine having a crank shaft and a crank case, of a clutch mechanism within said crank case comprising two members, one of which rotates with said crank shaft, and a motor operatively connected to one of said clutch members.

6. In a starting device, the combination with an engine having a crank shaft and a crank case, of a motor, means within said crank case for operatively connecting said motor to said crank shaft, said means comprising a shiftable member, and means for shifting said member.

7. In a starting device, the combination with an engine having a crank shaft and a crank case, of a main bearing for said shaft, a gear mechanism within said crank case comprising a member rotatably mounted on said main bearing means for operatively connecting said member and said shaft, and means for actuating said gear mechanism.

8. In a starting device, the combination with an engine having a crank shaft, a crank case and a main bearing for said shaft, of a clutch mechanism within said crank case comprising a member fixed on said shaft and a member rotatably and slidably mounted on said main bearing, and means for rotating said rotatable member.

9. The combination with an engine having a crank shaft and a crank case, of a one-way clutch mechanism within said crank case comprising a member which rotates with said shaft, and means for rotating said clutch mechanism.

10. The combination with an engine having a crank shaft and a crank case, of a one way clutch mechanism within said crank case comprising a member which rotates with said shaft and means for rotating said clutch mechanism comprising reduction gear mechanism in said crank case.

11. The combination with an engine having a crank shaft and a crank case having an opening in one of its walls, of a housing for said opening, a gear member within said housing, means for operatively connecting said gear member to said crank shaft, and means for rotating said gear member.

12. In a starting device, the combination with an engine having a crank shaft and a crank case, of a one way clutch mechanism within said crank case comprising two members, one of which rotates with said crank shaft, a motor outside said crank case, and reduction gear mechanism operatively connecting said motor to one of said clutch members.

13. In a starting mechanism, the combination with an engine comprising a casing having an opening, and a detachable cover for said opening, of a gear wheel in said casing, a motor outside said casing comprising a shaft having a bearing between said casing and said cover.

In testimony whereof, I have hereunto subscribed my name this 22nd day of March 1913.

CHESTER B. MILLS.

Witnesses:
CHAS. N. PALMER,
B. B. HINES.